United States Patent [19]
Lee

[11] 3,747,805
[45] July 24, 1973

[54] CARTRIDGE FOR DISPENSING LIQUID
[75] Inventor: Ronald Harvey David Frank Lee, Potten End, Near Berkhamsted, England
[73] Assignee: Cooper, McDougall & Robertson Limited, Berkhamsted, England
[22] Filed: July 13, 1971
[21] Appl. No.: 162,184

[30] Foreign Application Priority Data
July 30, 1970  Great Britain.................... 36,820/70

[52] U.S. Cl..................... 222/82, 222/183, 239/308
[51] Int. Cl................................................. B67b 7/24
[58] Field of Search....................... 222/82, 81, 136, 222/145, 183; 239/307, 308

[56] References Cited
UNITED STATES PATENTS
| | | | |
|---|---|---|---|
| 2,024,208 | 12/1935 | Deschner............................ | 222/82 |
| 3,554,410 | 1/1971 | Chambers...................... | 239/308 X |
| 3,181,737 | 5/1965 | Chaucer............................. | 222/137 |
| 3,475,010 | 10/1969 | Cook et al. ..................... | 222/136 X |
| 2,414,911 | 1/1947 | Temple............................... | 222/81 |

FOREIGN PATENTS OR APPLICATIONS
696,648  10/1965  Italy................................... 239/307

Primary Examiner—M. Henson Wood, Jr.
Assistant Examiner—John J. Love
Attorney—Anthony P. Delio et al.

[57] ABSTRACT

A cartridge suitable for dispensing liquid comprising the combination of a pressure - packed container and an hermetically sealed outer canister pierceable in one area and partially filled with a carrier liquid, said pressure - packed container having an active ingredient dispersed therein and a valve permitting discharge of said active ingredient from said pressure - packed container upon application of force to said valve, said pressure - packed container securely located within said outer canister whereby upon application to said valve of force originating external of said outer canister said active ingredient is discharged from said pressure - packed container into said carrier liquid and egress of said carrier liquid and said active ingredient from said outer canister occurs upon rupture of the one area of said outer canister. There is also provided a method of controlling insects in a closed environment comprising discharging an insecticide into said closed environment from said cartridge.

26 Claims, 10 Drawing Figures

INVENTOR
Ronald H. D. F. Lee

BY De Lio and Montgomery
ATTORNEYS

INVENTOR
Ronald H. D. F. Lee

BY Dexio and Montgomery
ATTORNEYS

INVENTOR
Ronald H.D.F. Lee

BY Dedio and Montgomery
ATTORNEYS

INVENTOR
Ronald H. D. F. Lee

BY De Lio and Montgomery
ATTORNEYS

CARTRIDGE FOR DISPENSING LIQUID

This invention relates to cartridges for dispensing liquids and their use in controlling insects.

The present invention provides a cartridge for dispensing liquid comprising a pressure-packed container having an active ingredient therein and equipped with a discharge valve, and an outer canister partially filled with a carrier liquid and having the pressure-packed container securely located therein to allow the contents of the pressure-packed container to be discharged and dispersed into the carrier liquid upon application of force to the discharge valve, the said canister being hermetically sealed and having a portion of its surface pierceable by an outlet pipe to permit egress of the contents of the canister through the pipe after the discharge of the contents of the pressure-packed container into the outer canister.

The contents of the canister may be drawn off through the outlet pipe by means of a pump. As another possibility the contents may be expelled from the canister by a propellant fluid initially held within the pressurepacked container and discharged therefrom together with the active ingredient into the carrier liquid in the canister. Suitable propellant fluids include those commonly used in the pressure-packaging art, for example polyhalogenated hydrocarbons including members of the Arcton (Trade name) series, and hydrocarbons such as, for example, propane and butane. The active ingredient is preferably a fluid which may be either miscible or immiscible with the carrier liquid held in the canister so that a solution or dispersion respectively is formed when the active ingredient is discharged thereinto. The active ingredient and carrier liquid should be sufficiently chemically inert with respect to each other that the active ingredient is not totally degraded during the period that the two are in contact together. The pressure-packed container may hold more than one active ingredient and such compounds may include deodorants, reodorants, bactericides and insecticides. The discharge valve of the pressure-packed container may be of the "one-shot" type or may be constructed so as to permit of more than one discharge operation. The outlet pipe may be equipped with a regulator valve or constriction to provide for prolonged dispensation of the contents of the canister.

Separation of the carrier liquid and active ingredient fractions of the dispensed contents of the canister may occur by evaporation of either one fraction from the other. To effect this the cartridge is advantageously incorporated with an air conditioning or humidification or joint conditioning-humidification system, the cartridge being used in conjunction with an aerosol generator of the spinning disc type wherein a series of baffles screens the droplets issued forth into the main body of air. By such means the active ingredient is distributed throughout a large volume of air in a uniform and controlled manner. The cartridge is particularly advantageously incorporated with such air systems in aircraft, and is especially valuable in this capacity when the active ingredient is an insecticide. The controlled release and distribution of such a compound in the manner hereinbefore described is in accord with the requirements of the International Sanitary Regulations adopted by the World Health Organization concerning the disinsection of aircraft. Reference is made to the World Health Organization document "Specification for an Aircraft Vapour Disinsection System," specification WHO/EQP/9. A suitable insecticide is DDVP (dimethyldichlorovinyl phosphate), which may be used with water as the carrier liquid.

In one embodiment of the invention, the cartridge comprises a hermetically sealed cylindrical canister closed at one end and having a protruding concentric cylindrical neck at the other end closed by a pierceable membrane, the canister having therein a pressure-packed container disposed along the longitudinal axis of the canister, an actuating member disposed along the same axis for operating the discharge valve of the pressure-packed container upon application to the actuating member of force originating external to the canister, and a support structure for securely locating the pressure-packed container in relation to the actuating member.

In an alternative embodiment of the invention, the cartridge comprises a hermetically sealed cylindrical canister having a protruding concentric cylindrical neck at both ends, the one neck being closed by a pierceable membrane and the other neck being closed by a resilient membrane, the canister having therein a pressure-packed container disposed along the longitudinal axis of the canister, an actuating member disposed along the same axis for operating the discharge valve of the pressure-packed container upon application to the resilient membrane of force originating external to the canister, and a support structure for securely locating the pressure-packed container in relation to the actuating member.

It is desirable to guard against accidental rupture of the pierceable membrane and consequent discharge of the liquid from the canister. A removeable non-deformable, non-pierceable cover fitted over the membrane ensures not only that such an accident is prevented but that any tampering with the cartridge is readily apparent.

It is likewise desirable to guard against accidental, premature discharge of the pressure-packed container within the canister by inadvertant application of pressure to the resilient membrane, when present, or by jarring or knocking of the cartridge. It will be appreciated that there will be no externally visible sign of such discharge having occurred as, for example, the resilient membrane will have reassumed its unstressed shape when the force is removed. It will further be appreciated that in those instances where the carrier liquid and active ingredient react together chemically to the degradation of the latter, premature mixing of the two compounds could mean that the active ingredient is no longer sufficiently active when the contents of the canister are deliberately dispensed therefrom. Small relative movements between the canister, pressure-packed container and actuating member, such as may be set up by jarring or knocking of the cartridge, are damped out by a spring placed between the pressure-packed container and the canister. A small gap between the resilient membrane, when present, and the underlying integer within the canister allows limited deformation of the membrane before the deforming force is transmitted to the discharge valve of the pressure-packed container. A removeable non-deformable, non-pierceable cover fitted over the resilient membrane shields the latter from externally-applied pressures; this cover and that over the pierceable membrane need only be removed immediately prior to the cartridge being used.

Examples of cartridges according to the present invention will now be described with reference to the accompanying drawings in which:

Figure 1:
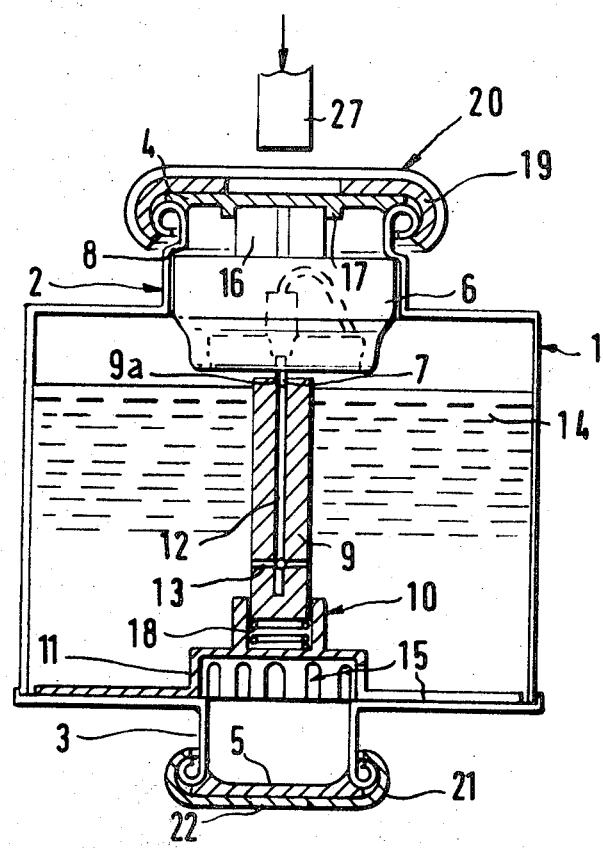
FIG. 1 is a lateral view of a median vertical section through a cartridge according to the invention and shown with a plunger and piercing member associated with said cartridge.

In FIG. 1, a cylindrical canister 1 made of tin plate has opposed protruding concentric cylindrical necks 2,3, the opening in the neck 2 being closed by a resilient rubber membrane 4 and the opening in the neck 3 by a pierceable rubber membrane 5. A pressure-packed container 6, also of tin plate, having a valve and a discharge tube 7 is slidably locatd inside the neck 2 so that its base abuts a ledge 8 and its discharge tube 7 tightly fits inside a recess 9a in a plastic support member 9, the opposite end of which is slidably located within a cup 10 of an aluminum support spider 11. The support member 9 has a central bore 12 continuous with the recess 9a and leading into lateral passages 13 which open beneath the surface of a liquid 14 which partially fills the canister 1. Ports 15 in the support spider 11 lead from the body of the canister 1 to the neck 3. A rigid plastic spacer 16 lies between the pressure-packed container 6 and the resilient membrane 4, where it is slidably located by guides 17 integral with the resilient membrane 4. The disposition of the pressure-packed container 6, the spacer 16 and the resilient membrane 4 is such that a small gap exists between the spacer 16 and the resilient membrane 4. A nylon spring 18 is interposed between the support member 9 and the base of the cup 10, wherein it is slidably located. The resilient membrane 4 is sealed to the neck 2 by a rigid aluminium sealing ring 19 which is in turn overlain by a removeable cover 20 of aluminium foil. The pierceable membrane 5 is sealed to the neck 3 by an outer cover 21, also of aluminium foil, which has a detachable central disc 22.

The cartridge is shown associated with a stainless steel piercing member 23 having a collar 24, an internal channel 25 and port 26, and with a metal plunger 27, both of which lie out of contact with the outer covers 21 and 20 respectively.

Prior to use, the outer cover 20 is removed from the cartridge together with the central disc 22 of cover 21. The cartridge is then placed within the housing and firmly located therein relative to both the piercing member 23 and the plunger 27 which, when actuated, are simultaneously brought into contact with the cartridge. Piercing member 23 passes through the pierceable membrance 5 to a predetermined depth so that the port 26 lies inside the pierceable membrane 5 and an effective seal is formed by the collar 24 in abutment with the pierceable membrane 5. Plunger 27 presses on the resilient membrane 4, deforming it and moving the spacer 16 and pressure-packed container 6 relative to the canister 1; the spring 18 is compressed and the discharge tube 7 pressed against the support member 9 to operate the discharge valve of the container 6.

The tight fit of the discharge tube 7 in the recess 9a in the support member 9 ensures that the contents of the pressure-packed container 6 are expelled through the central bore 12 of the support member 9 and exit via the lateral passages 13 into the liquid 14. By operation of a suction pump (not shown) connected to channel 25, the contents of the canister 1 are drawn off therefrom, egressing by way of the ports 15 in the support spider 11, flowing into the cavity of the neck 3 and out through the channel 25 in the piercing member 23 via the port 26.

Location of the cartridge within the housing is effected by means of, for example, spring clips holding the cartridge by the necks 2 and 3; as a second possibility, the housing is shaped so as to snugly receive the cartridge therein. Movement of piercing member 23 and plunger 27 as hereinbefore described is effected by means of any suitable mechanical system, said system advantageously incorporating a locking device to prevent inadvertant return of piercing member 23 and plunger 27 to the pre-actuated position. As an example of a suitable system may be mentioned an over-centre lever assembly.

In other embodiments the cartridge is located within the housing such that either or both of the piercing member 23 and the plunger 27 contact pierceable membrane 5 and resilient membrane 4 respectively. It will however be understood that in such embodiments penetration of pierceable membrane 5 by piercing member 23, and deformation of resilient membrance 4 by plunger 27 to an extent sufficient to cause operation of the discharge valve of the container 6 in the manner hereinbefore described, is not effected until piercing member 23 and plunger 27 respectively are actuated.

In yet further embodiments only one of piercing member 23 and plunger 27 is caused to move relative to the housing once the cartridge is located therein, the movement of this one integer towards the second effecting movement of the cartridge relative to both the housing and the second integer, and effecting penetration of pierceable membrane 5 by piercing member 23, deformation of resilient membrane 4 by plunger 27 and operation of the discharge valve of container 6 in the manner hereinbefore described.

In different embodiments the canister 1 is made of impact extruded aluminium or plastic and the pressure-packed container 6 is made of impact extruded aluminium, plastic or glass, and either may be laquered or similarly protected against corrosion. Any suitable elastomeric material may replace rubber as the material of the membranes 4 and 5, and the support spider 11 may be of tin plate or plastic instead of aluminium. The spacer 16 may alternatively be of metal, the spring 18 may be of plastic, or of metal such as, for example, plated spring steel, and the sealing ring 19 may be of mild plated steel.

Figure 1A:
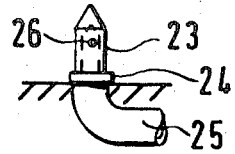
FIG. 1a is a lateral view of another embodiment of the piercing member shown in FIG. 1.

FIG. 1a shows another embodiment of the piercing member 23. This second embodiment has two internal channels 28, 29, with ports 30, 31, respectively. Such an arrangement allows the contents of the canister 1 to be circulated between the canister 1 and an external device, the contents leaving the canister 1 via the port 30 and channel 28 and re-entering via the channel 29 and port 31.

Figure 2:
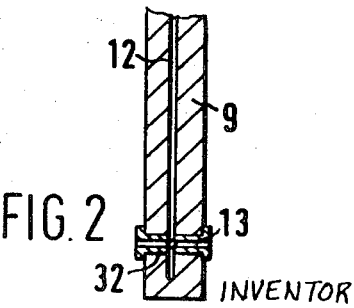
FIG. 2 is a lateral view of a median vertical section through a different form of a support member shown in FIG. 1.

FIG. 2 shows a different form of the support member 9 wherein the lateral passages 13 have hollow liners 32 of a polymeric material such as nylon, high density polythene, or poly-propylene.

Figure 3:
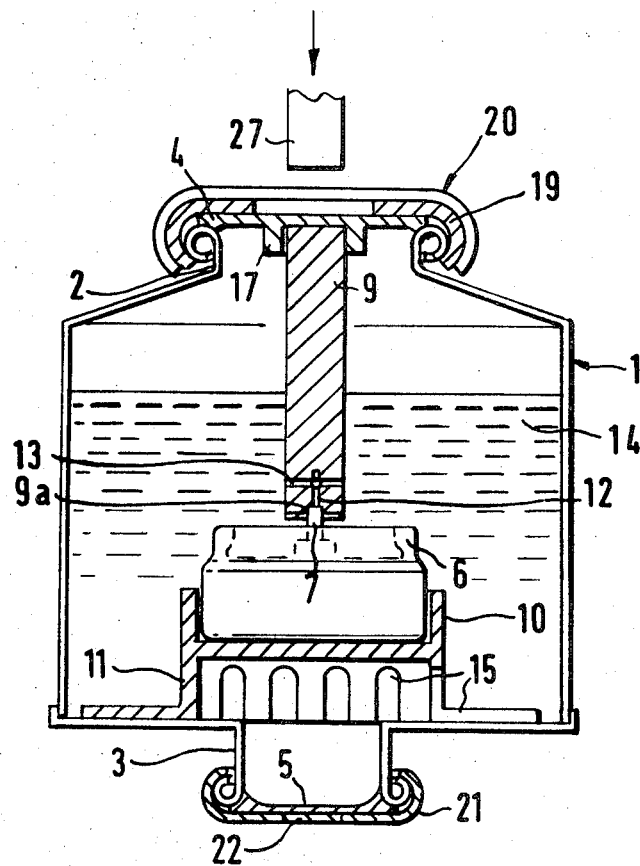
FIG. 3 is a lateral view of a median vertical section through a second cartridge according to the invention and shown with a plunger and piercing member associated with said cartridge.

In FIG. 3, the base of the pressure-packed container 6 is slidably located in the cup 10 of the support spider 11. In one end of the support member 9 and continuous with the central bore 12 therein is a recess 9a which fits tightly over the discharge tube 7 of the pressure-packed container 6; the other end of the support member 9 is slidably located by guides 17 integral with the resilient membrane 4, between which latter and the support member 9 there exists a small gap.

The cartridge is made ready for use in exactly the same way as is the embodiment shown in FIG. 1. When the housing is actuated, the piercing member 23 passes through the pierceable membrane 5 and the plunger 27 presses on the resilient membrane 4, deforming it and moving the support member 9 relative to the canister 1; the discharge tube 7 is depressed by the support member 9 and the valve of the pressure-packed container 6 is operated. The contents of the pressure-packed container 6 are expelled therefrom through the central bore 12 and lateral passages 13 of the support member 9 into the liquid 14. The contents of the canister 1 leave by the same route and in the manner described for the embodiment in FIG. 1.

Figure 4:
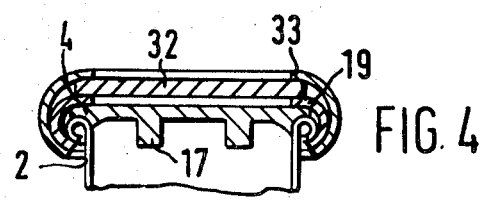
FIG. 4 is a lateral view of a median section through a second embodiment of a protective cover shown in FIGS. 1 and 3.

FIG. 4 shows a different form of seal for the neck 2 of the canister 1, wherein a circular plate 32 of metal or rigid plastic is located between the rigid sealing ring 19 and a removeable aluminium ring seal 33, the diameter of the plate 32 being greater than that of the central hole in either of the rings 19 and 33. To prepare a cartridge fitted with such a seal for use, the seal 33 and the plate 32 are both removed prior to locating the cartridge in the housing.

Figure 5:
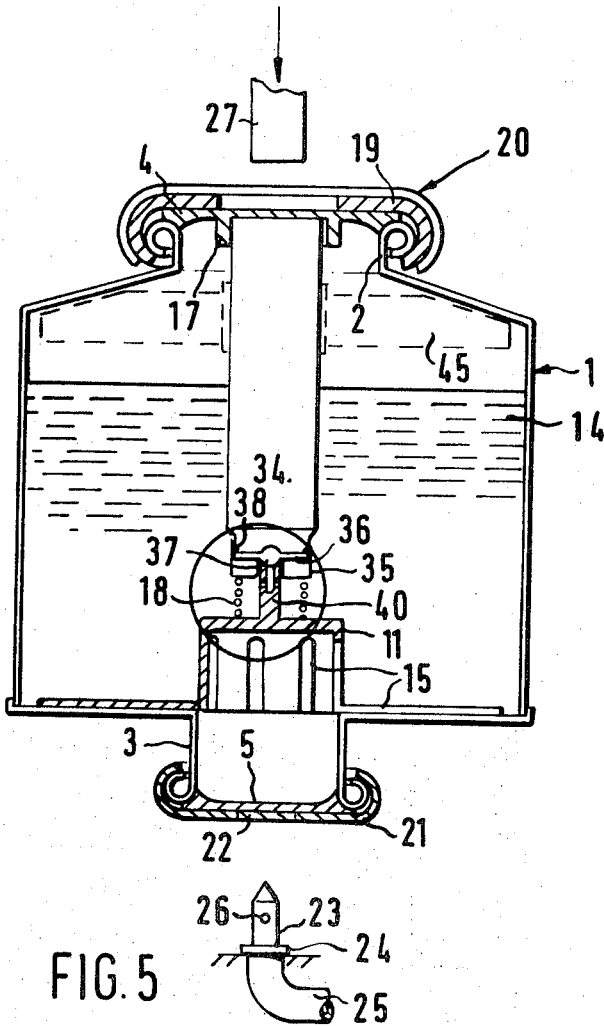
FIG. 5 is a lateral view of a median vertical section through a third cartridge according to the invention and shown with a plunger and piercing member associated with said cartridge.
Figure 5A:
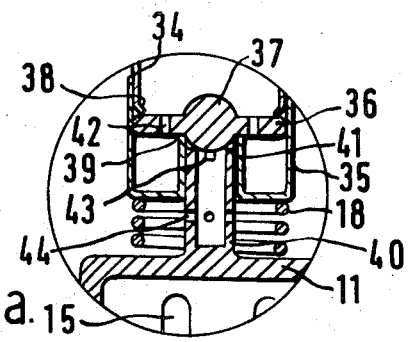
FIG. 5a is an enlargement of the encircled portion of FIG. 5.

In FIGS. 5 and 5a an aluminium pressure-packed container 34 with an affixed aluminium cap 35 has a resilient rubber valve 36 having a central spherical portion 37. The valve 36 is seated against a rim 38 in the pressure-packed container 34 and seals the container at the point of contact of the central spherical portion 37 with the edge 39 of the cap 35.

The base of the pressure-packed container 34 is slidably located by guides 17 integral with the resilient membrane 4; at the other end the cap 35 of the container 34 slidably houses a cylindrical extension 40 of a support spider 11, the rim 41 of the extension 40 engaging with the central spherical portion 37 of valve 36. A spring 18 is interposed between the support spider 11 and the cap 35 and encircles the cylindrical extension 40. The valve 36 has orifices 42 allowing the contents of the container 34 to pass into the cap 35, and the rim 41 of the cylindrical extension 40 has notches 43; ports 44 in the base of the extension 40 communicate between the interior of the canister 1 and the interior of extension 40. The container 34 is optionally additionally held within the canister 1 by a locating web 45 of plastic or mild steel.

The cartridge is made ready for use in the same way as is the embodiment shown in FIG. 1. When the housing is actuated the piercing member 23 passes through the pierceable membrane 5 and the plunger 27 presses on the resilient membrane 4, deforming it and moving the container 34 towards the support spider 11; the spring 18 is compressed and the central spherical portion 37 of the valve 36 is pushed inwards by the rim 41 of the cylindrical extension 40 and is lifted away from the edge 39 of the cap 35.

The contents of container 34 pass between the central spherical portion 37 of valve 36 and the edge 39 of the cap 35 into the cylindrical extension 40 through the notches 43, then leave extension 40 through ports 44 and mix with the liquid 14 in the canister 1. The contents of the canister 1 leave by the same route and in the manner described for the embodiment in FIG. 1.

Figure 6:
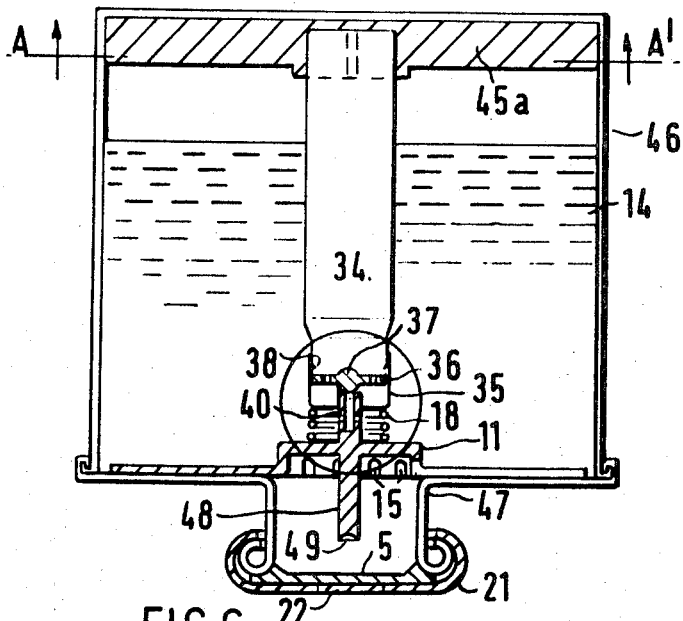
FIG. 6 is a lateral view of a median vertical section through a fourth cartridge according to the invention and shown with a piercing member associated with said cartridge.
Figure 6A:
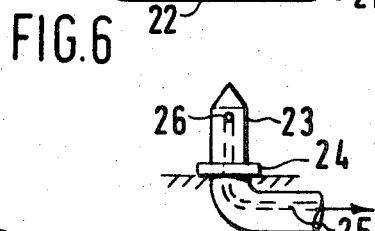
FIG. 6a is a section on the line A—A' of the cartridge shown in FIG. 6.
Figure 6A:
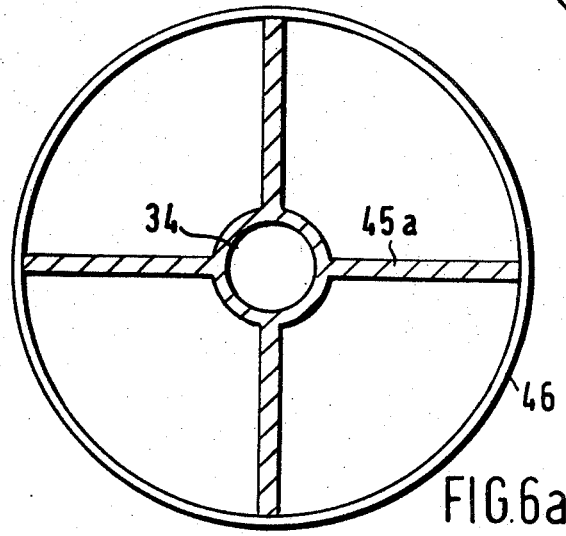
Figure 6B:
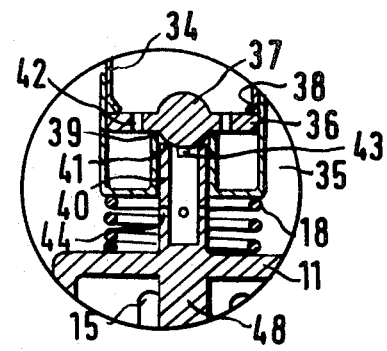
FIG. 6b is an enlargement of the encircled portion of FIG. 6.

In FIGS. 6, 6a and 6b a cylindrical canister 46 of tin plate or impact extruded aluminium is closed at one end and has a protruding concentric cylindrical neck 47 at the other end which is closed by a pierceable membrane 5 having an outer cover 21 with a detachable central disc 22. Into the neck 47 of the canister 46 projects a shaft 48 from the centre of a support spider 11 which is slidably located inside the base of the canister 46. An aluminium pressure-packed container 34 with an affixed aluminium cap 35 and having a resilient rubber valve 36 with a central spherical portion 37, is firmly held by a locating web 45a of plastic or mild steel which is itself securely fixed inside the closed end of canister 46. The valve 36 of the container 34 is seated against a rim 38 and seals the container at the point of contact of the central spherical portion 37 with the edge 39 of the cap 35. Cap 35 slidably houses a cylindrical extension 40 from the inner surface of the support spider 11, the rim 41 of the extension 40 engaging with the central spherical portion 37 of valve 36. A spring 18 is interposed between support spider 11 and cap 35 and encircles extension 40. Valve 36 has orifices 42 allowing the contents of container 34 to pass into cap 35, and the rim 41 of extension 40 has notches 43; ports 44 in the base of extension 40 communicate between the interior of the canister 46 and the interior of extension 40. The shaft 48 projecting from the support spider 11 has a terminal depression 49.

Prior to use, the central disc 22 is removed from the cover 21. For discharge of the contents of the cartridge, it is positioned in a housing which differs from those associated with other embodiments shown in FIGS. 1, 3 and 5 in that there is present only the piercing member 23. When the housing is actuated, the piercing member 23 passes through the pierceable membrane 5 to engage with depression 49 in the shaft 48 projecting from the support spider 11. The predetermined depth of penetration of the piercing member 23 is such that not only is an effective seal formed by the collar 24 in abutment with the pierceable membrane 5 but the support spider 11 is lifted away from the base of the canister 46; the spring 18 is compressed and the central spherical portion 37 of the resilient valve 36 is pushed inwards by the rim 41 of extension 40 to allow escape of the contents of the pressure-packed container 34 in a manner identical with that described for the embodiment shown in FIGS. 5 and 5a. The contents of the canister 46 leave by the same route and in the manner described for the embodiment shown in FIG. 1.

Each of the cartridges shown in FIGS. 1,3,5, and 6 may be associated with a housing possessing the alternative, twin-channel embodiment of the piercing member 23 as shown in FIG. 1a. The lateral passages 13 in support member 9 of each of the cartridges shown in FIGS. 1 and 3 may have hollow liners of polymeric material as the embodiment shown in FIG. 2, and the neck 2 of each of the cartridges shown in FIGS. 1, 3 and 5 may have the alternative form of seal shown in FIG. 4.

There is also provided by the present invention a method of controlling insects in a closed environment comprising discharging an insecticide into the environment from a cartridge, said cartridge comprising a pressure-packed container having the insecticide therein and equipped with a discharge valve, and an outer canister partially filled with a carrier liquid and having the pressure-packed container securely located therein to allow the contents of the pressure-packed container to be discharged and dispersed into the carrier liquid upon application of force to the discharge valve, the said canister being hermetically sealed and having a portion of its surface pierceable by an outlet pipe to permit egress of the contents of the canister through the pipe after the discharge of the contents of the pressure-packed container into the outer canister.

What is claimed is:

1. A cartridge suitable for dispensing liquid comprising the combination of a pressure-packed container and an hermetically sealed outer canister pierceable in one area and partially filled with a carrier liquid, said pressure-packed container having an active ingredient dispersed therein and a valve permitting discharge of said active ingredient from said pressure-packed container upon application of force to said valve, said pressure-packed container being securely located within said outer canister whereby upon application to said valve of force originating external of said outer canister said active ingredient is discharged from said pressure-packed container into said carrier liquid and egress of said carrier liquid and said active ingredient from said outer canister occurs upon rupture of the one area of said outer canister;

wherein said outer canister is cylindrical and has two ends, the one end closed and the second end bearing a cylindrical neck concentric with said outer canister and protruding therefrom and closed by a pierceable membrane, wherein said pressure-packed container is securely located along the longitudinal axis of said outer canister and relative to an actuating member disposed along said axis, whereby said force originating external of said outer canister is transmitted to said valve of said pressure-packed container by said actuating member.

2. A cartridge defined in claim 1 wherein within said outer canister is a web whereby said pressure - packed container is located within said outer canister.

3. A cartridge defined in claim 1 wherein said actuating member is bored and is disposed relative to said pressure-packed container whereby said active ingredient discharged from said pressure - packed container is discharged into said carrier liquid through said actuating member.

4. A cartridge defined in claim 1 wherein said outer canister slidably houses a support spider whereby said actuating member is disposed along said axis of said outer canister.

5. A cartridge defined in claim 4 wherein said actuating member is integral with said support spider.

6. A cartridge defined in claim 4 wherein said force originating external of said outer canister is received upon an area of said support spider whereby said force is transmitted to said valve of said pressure - packed container upon movement of said support spider and said actuating member relative to said outer canister and toward said pressure - packed container.

7. A cartridge defined in claim 6 wherein said force originating external of said outer canister is received upon a shaft projecting from said support spider.

8. A cartridge defined in claim 4 wherein a spring is interposed between said support spider and said pressure - packed container whereby said spring is compressed by movement of said support spider towards said pressure - packed container.

9. A cartridge suitable for dispensing liquid comprising the combination of a pressure-packed container and an hermetically sealed outer canister pierceable in one area and partially filled with a carrier liquid, said pressure-packed container having an active ingredient dispersed therein and a valve permitting discharge of said active ingredient from said pressure-packed container upon application of force to said valve, said pressure-packed container being securely located within said outer canister whereby upon application to said valve of force originating external of said outer canister said active ingredient is discharged from said pressure-packed container into said carrier liquid and egress of said carrier liquid and said active ingredient from said outer canister occurs upon rupture of the one area of said outer canister;

wherein said outer canister is cylindrical and has two ends, the one end bearing one cylindrical neck concentric with said outer canister and protruding therefrom and closed by a pierceable membrane and the second end bearing a second cylindrical neck concentric with said outer canister and protruding therefrom and closed by a resilient membrane, said pressure-packed container being disposed along the longitudinal axis of said outer canister and securely located relative to an actuating member also disposed along said axis, whereby force originating external of said outer canister and applied to said resilient membrane is transmitted to said valve of said pressure-packed container by said actuating member.

10. A cartridge defined in claim 9 wherein said actuating member is bored and is disposed relative to said pressure - packed container whereby said active ingredient from said pressure - packed container is discharged into said carrier liquid through said actuating member.

11. A cartridge defined in claim 10 wherein at least a part of said bored actuating member is hollowly lined with a polymeric material.

12. A cartridge defined in claim 9 wherein a support spider is located within said outer canister whereby one of said pressure - packed container and said actuating member is disposed within said outer canister.

13. A cartridge defined in claim 12 wherein said support spider is shaped whereby one of said pressure - packed container and said actuating member slidably received and is disposed within said outer canister.

14. A cartridge defined in claim 12 wherein said actuating member is integral with said support spider.

15. A cartridge defined in claim 13 wherein a spring is slidably located between said support spider and the one of said pressure - packed container and said actuating member located by said support spider.

16. A cartridge defined in claim 14 wherein a spring is interposed between said support spider and said pressure - packed container whereby said spring is compressed by movement of said pressure - packed container towards said support spider.

17. A cartridge defined in claim 9 wherein a support spider is located within said outer canister and wherein said resilient membrane has guides integral therewith whereby the one of said pressure - packed container and said actuating member is disposed within said outer canister by said support spider and the second is located within said outer canister by said guides.

18. A cartridge defined in claim 9 wherein a support spider is located within said outer canister and wherein said neck of said outer canister sealed by said resilient membrane is shaped whereby the one of said pressure - packed container and said actuating member is disposed within said outer canister by said support spider and the second is located within said outer canister and is slidably received by said neck.

19. A cartridge defined in claim 18 wherein a spacing member is interposed between said resilient membrane and the second of said pressure - packed container and said actuating member.

20. A cartridge defined in claim 19 wherein said resilient membrane has guides integral therewith whereby said spacing member is located.

21. A cartridge defined in claim 9 wherein within said outer canister is a web whereby one of said actuating member and said pressure - packed container is slidably located within said outer canister.

22. A cartridge defined in claim 1 wherein said pierceable membrane has a non-pierceable outer cover whereof at least a portion is detachable whereby upon application to said pierceable membrane of said force originating external of said outer canister said pierceable membrane is ruptured.

23. A cartridge defined in claim 9 wherein said pierceable membrane has a non-pierceable outer cover whereof at least a portion is detachable whereby upon application to said pierceable membrane of force originating external of said outer canister said pierceable membrane is ruptured.

24. A cartridge defined in claim 9 wherein said resilient membrane has a rigid outer cover whereof at least a portion is removeable whereby force originating external of said canister is applied to said resilient membrane.

25. In a system for dispensing an active ingredient into the interior of an aircraft, the combination of an aerosol generator with a cartridge comprising the combination of a pressure-packed container and an hermetically sealed outer canister pierceable in one area, said outer canister being partially filled with a carrier liquid, said pressure-packed container having an active ingredient dispersed therein and a valve enabling discharge of said active ingredient from said pressure-packed container upon application of force to said valve, said pressure-packed container being securely located within said outer canister, said cartridge being located within a housing comprising a pipe means for enabling flow of liquid to said aerosol generator, said pipe means defining an inlet port, said pipe means being adapted to pierce said one area of said outer canister, whereby upon application to said valve of force originating external of said cartridge said active ingredient is discharged from said pressure-packed container into said carrier liquid, and egress of said carrier liquid and said active ingredient from said outer canister to said aerosol generator through said pipe means via said inlet port occurs upon said pipe means piercing said one area of said outer canister;

wherein said outer canister is cylindrical and has two ends, the one end closed and the second end bearing a cylindrical neck concentric with said outer canister and protruding therefrom and closed by a pierceable membrane, wherein said pressure-packed container is securely located along the longitudinal axis of said outer canister and relative to an actuating member disposed along said axis, whereby said force originating external of said outer canister is transmitted to said valve of said pressure-packed container by said actuating member.

26. A system according to claim 25 wherein said active ingredient is an insecticide.

* * * * *

UNITED STATES PATENT OFFICE
CERTIFICATE OF CORRECTION

Patent No. 3,747,805      Dated July 24, 1973

Inventor(s) Ronald Harvey David Frank Lee

It is certified that error appears in the above-identified patent and that said Letters Patent are hereby corrected as shown below:

In the Abstract, delete the last sentence. Column 3, line 40, "locatd" should read --located--. Claim 13, line 3, after "member" insert --is--.

Signed and sealed this 18th day of December 1973.

(SEAL)
Attest:

EDWARD M. FLETCHER, JR.
Attesting Officer

RENE D. TEGTMEYER
Acting Commissioner of Patents